(12) United States Patent
Kanagarajan et al.

(10) Patent No.: US 12,020,578 B2
(45) Date of Patent: *Jun. 25, 2024

(54) SYSTEMS AND METHODS FOR ADDING RELEVANT DATA TO ATC TRANSCRIPTION MESSAGES

(71) Applicant: HONEYWELL INTERNATIONAL INC., Charlotte, NC (US)

(72) Inventors: Sivakumar Kanagarajan, Bangalore (IN); Hariharan Saptharishi, Madurai (IN); Gobinathan Baladhandapani, Madurai (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 70 days.

This patent is subject to a terminal disclaimer.

(21) Appl. No.: 17/655,285

(22) Filed: Mar. 17, 2022

(65) Prior Publication Data

US 2023/0215278 A1 Jul. 6, 2023

(30) Foreign Application Priority Data

Jan. 6, 2022 (IN) .............................. 202211000754

(51) Int. Cl.
*G08G 5/00* (2006.01)
*G06F 3/0481* (2022.01)
(Continued)

(52) U.S. Cl.
CPC ......... *G08G 5/0017* (2013.01); *G06F 3/0481* (2013.01); *G08G 5/0039* (2013.01);
(Continued)

(58) Field of Classification Search
CPC .... G08G 5/0017; G08G 5/0043; G10L 15/22; G10L 15/26; G10L 13/00; H04B 7/18506
See application file for complete search history.

(56) References Cited

U.S. PATENT DOCUMENTS 8,874,288 B1 10/2014 Siddiqui
9,153,137 B2 10/2015 Hankers et al.
(Continued)

FOREIGN PATENT DOCUMENTS

EP 3474256 A1 4/2019

OTHER PUBLICATIONS

"ATIS, Pushback and Taxi," ATIS Communication Summary, downloaded from https://infiniteflight.com/guide/flying-guide/atc-communication/atis-pushback-and-taxi on Nov. 10, 2021.

Primary Examiner — Mirza F Alam
(74) Attorney, Agent, or Firm — Lorenz & Kopf LLP

(57) ABSTRACT

Systems and methods for converting voice to text messages in an aircraft. The systems and methods transcribe voice messages between a member of the flight crew and Air Traffic Control (ATC) to provide ATC text messages, transcribe a voice-automatic terminal information service report (voice-ATIS) to provide an ATIS text report, determine flight context data based at least on an analysis of the ATC text messages, determine relevant ATIS data from the ATIS text report using the flight context data, and render a visual User Interface (UI) including at least some of the ATC text messages and at least some of the relevant ATIS data on the same ATC transcription page.

19 Claims, 7 Drawing Sheets

(51) Int. Cl.
*G10L 15/22* (2006.01)
*G10L 15/26* (2006.01)

(52) U.S. Cl.
CPC ............ *G08G 5/0043* (2013.01); *G10L 15/22* (2013.01); *G10L 15/26* (2013.01)

(56) References Cited

U.S. PATENT DOCUMENTS

| | | | |
|---|---|---|---|
| 10,810,892 | B2 | 10/2020 | Kalyan et al. |
| 2010/0027768 | A1* | 2/2010 | Foskett .............. H04B 7/18506 704/235 |
| 2010/0030400 | A1* | 2/2010 | Komer ................. G08G 5/0021 704/251 |
| 2012/0147030 | A1* | 6/2012 | Hankers .............. G09B 29/006 345/619 |
| 2013/0346081 | A1* | 12/2013 | Loubiere ................. G10L 13/00 704/260 |
| 2015/0081292 | A1* | 3/2015 | Populus ............... G08G 5/0095 704/235 |
| 2015/0162001 | A1 | 6/2015 | Kar et al. |
| 2016/0012737 | A1* | 1/2016 | Zimmer ............... G08G 5/0021 701/120 |
| 2021/0020168 | A1* | 1/2021 | Dame .................. G08G 5/0013 |
| 2021/0233411 | A1 | 7/2021 | Saptharishi et al. |

* cited by examiner

SYSTEMS AND METHODS FOR ADDING RELEVANT DATA TO ATC TRANSCRIPTION MESSAGES

CROSS-REFERENCE TO RELATED APPLICATION

This application claims priority to India Provisional Patent Application No. 202211000754, filed Jan. 6, 2022, the entire content of which is incorporated by reference herein.

TECHNICAL FIELD

The subject matter described herein relates to the automated transcription of air traffic control (ATC) messages and augmenting the ATC messages with further relevant information.

BACKGROUND

Air traffic control (ATC) systems may utilize voice communications to transmit various messages between air traffic controllers and pilots. The messages that are transmitted between air traffic controllers and pilots include, among other things, air traffic control clearances, various advisories, and aviation weather service, which help ensure coordination of aircraft movement and appropriate aircraft separation. Broadcast messages from/to ATC can be transcribed and displayed on a pilot window of an Electronic Flight Bag (application). To do so, a voice to text transcription application transcribes the broadcast messages. In particular, the transcription application provides direct translation of conversation messages between crew and a ground ATC member.

Automatic Terminal Information Service (ATIS) is a continuous broadcast of recorded aeronautical information in terminal areas. ATIS broadcasts contain relevant information, such as current weather information, active runways, winds, available approaches, QNH (the pressure set on the subscale of the altimeter so that the instrument indicates its height above sea level), and any other information supporting pilots. Other relevant reports include Notice to Air Missions (NOTAMs) and Meteorological Terminal Air Reports (METARs). Flight crew study the various services, such as ATIS and NOTAMs, during the preflight and also listen to these reports before beginning an approach to a destination aerodrome. Information from such reports may impact an active flight plan and any changes to the active flight plan requested by ATC. Simultaneously listening to the reports and taking into account ATC requests can be taxing for a pilot during an already high workload flight phase and could lead to inaccuracies or errors during takeoff and landing.

It is desirable to provide methods and systems that provide intelligent support for the flight crew to make decisions based on broadcast ATC messages. It would further be desirable to provide information to help the crew to quickly, and appropriately, act in response to ATC messages and further increase cockpit situational awareness. It is also beneficial to streamline a process of updating an active flight plan based on any changes in ATIS reports (or other broadcast reports) and ATC requests. Furthermore, other desirable features and characteristics of the present invention will become apparent from the subsequent detailed description and the appended claims, taken in conjunction with the accompanying drawings and the foregoing technical field and background.

BRIEF SUMMARY

In one aspect, a method is provided of converting voice to text messages in an aircraft. The method includes transcribing, using a first voice to text application, voice messages between a member of the flight crew and Air Traffic Control (ATC) to provide ATC text messages, transcribing, using a second voice to text application, a voice-automatic terminal information service report (voice-ATIS) to provide an ATIS text report, determining, via a processor, flight context data based at least on an analysis of the ATC text messages, determining, via the processor, relevant ATIS data from the ATIS text report using the flight context data, and rendering, via the processor, a visual User Interface (UI) including at least some of the ATC text messages and at least some of the relevant ATIS data on the same ATC transcription page.

In embodiments, the visual UI includes a selectable ATIS element that, when selected, causes rending of an ATIS transcription page including the ATIS text report.

In embodiments, the method includes receiving, via the processor, an active flight plan from a Flight Management System (FMS) of the aircraft, and determining, via the processor, the flight context data based at least on an analysis of the ATC text messages and the active flight plan.

In embodiments, the method includes receiving, via the processor, an active flight plan from a Flight Management System (FMS) of the aircraft, comparing the relevant ATIS data to corresponding data included in the active flight, and highlighting part of the ATIS text report based on the comparison.

In embodiments, the method includes receiving, via the processor, an active flight plan from the Flight Management System (FMS) of the aircraft, and determining, via the processor, update data representing a recommended update to the active flight plan based on a comparison between the relevant ATIS data and the active flight plan.

In embodiments, the visual UI including the ATC transcription page includes a selectable update element that, when selected, causes the update data to be submitted to the FMS of the aircraft.

In embodiments, the ATIS text report includes one or more of: runway condition information, runway in use information, surface wind information, weather information, visibility information, cloud height information, approach type information, and holding information.

In embodiments, the ATC text messages include a description of an update to the active flight plan and the relevant ATIS data is determined based on ATIS data associated with the update to the active flight plan.

In embodiments, the update to the active flight plan includes a change in arrival or departure runway, which constitutes a new arrival or departure runway, and the ATIS data associated with the update to the active flight plan includes one or more of the following for the new arrival or departure runway: runway condition information and runway wind information.

In embodiments, the visual UI including the ATC transcription page includes a selectable update element that, when selected, causes the update to be submitted to the FMS of the aircraft.

In embodiments, the first and second voice to text applications are the same.

In embodiments, determining relevant ATIS data from the ATIS text report using the flight context data includes determining that ATIS data is relevant based at least in part on proximity of aircraft to a location referenced in the ATIS text report.

In embodiments, the method comprises transcribing one or more other reports including Aviation Routine Weather Reports (METARs) and/or Aviation Selected Special Weather Reports (SPECIs) and/or Notice to Air Missions (NOTAMs) and determining, via the processor, relevant data from the one or more other reports using the flight context data; and rendering, via the processor, a visual User Interface (UI) including at least some of the ATC text messages and at least some of the relevant data on the same ATC transcription page.

In embodiments, the visual UI depicts the ATC text messages and the relevant ATIS data on the same ATC transcription page in a visually differentiated manner.

In another aspect, a system for converting voice to text messages in an aircraft is provided. The system includes a receiver and transmitter for receiving and transmitting voice messages between a member of the flight crew and Air Traffic Control (ATC), a display device, and a processor in operable communication with the receiver and transmitter and the display device. The processor is configured to execute program instructions. The program instructions are configured to cause the processor to: transcribe the voice messages between the member of the flight crew and the ATC to provide ATC text messages, transcribe a voice-automatic terminal information service report (voice-ATIS) to provide an ATIS text report, determine flight context data based at least on an analysis of the ATC text messages, determine relevant ATIS data from the ATIS text report using the flight context data, and render a visual User Interface (UI) on the display device including at least some of the ATC text messages and at least some of the relevant ATIS data on the same ATC transcription page.

In embodiments, the program instructions are configured to cause the processor to: receive an active flight plan from a Flight Management System (FMS) of the aircraft and determine the flight context data based at least on an analysis of the ATC text messages and the active flight plan.

In embodiments, the program instructions are configured to cause the processor to: receive an active flight plan from the Flight Management System (FMS) of the aircraft, and determine update data representing a recommended update to the active flight plan based on a comparison between the relevant ATIS data and the active flight plan.

In embodiments, the visual UI including the ATC transcription page includes a selectable update element that, when selected, causes the update data to be submitted to the FMS of the aircraft.

In embodiments, determining relevant ATIS data from the ATIS text report using the flight context data includes determining that ATIS data is relevant based at least in part on proximity of aircraft to a location referenced in the ATIS text report.

In embodiments, the ATC text messages include a description of an update to an active flight plan and the relevant ATIS data is determined based on ATIS data associated with the update to the active flight plan.

The above described aspects and embodiments relating to a method are applicable to the system aspect.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Systems and methods described herein provide pilot and ATC conversation transcription in a user interface that allows a text version of the conversation between ATC and the pilot to be viewed in a single display window. The user interface is augmented with one or more of the following features: an interface to ATIS data (and other report sources such as METAR and NOTAM); the ATIS data is presented in an organized and uncluttered format; ATIS data that is relevant to a current flight context is differentiated; the relevant ATIS data is populated in the ATC transcription window in some instances such as when there is a change of clearance information; and a selectable GUI (Graphical User Interface) element is provided to submit any updates to the flight plan as a result of the relevant ATIS data and analysis of the ATC transcription.

The systems and methods described herein may include the following functional components. An ATC transcription application that also tunes to an ATIS (or other report source) frequency and transcribes the ATC application and also the ATIS report (voice to text). A data extractor that analyzes the ATIS data (or other report) based on current flight context to determine relevant ATIS data. The flight context is derived from the ATC conversation in its transcribed form and also from an active flight plan. A data comparator compares the relevant data with corresponding data in the active flight plan to determine any changes. The changes to the active flight plan can be highlighted in a text report window as compared to text that is not determined to be relevant and changed. The application may receive the active flight plan through a cFMS (connected Flight Management System) or another open world system. A decoder interprets the conversation data between the pilot and ATC and automatically populates part of the ATIS data in the ATC transcription window. A selectable element (GUI (Graphical User Interface)) may be included in the user interface (in the ATC transcription window) for the pilot to confirm any active flight plan updates and to submit those updates to the FMS. The decoder works in conjunction with the FMS to update the active flight plan.

Figure 1:
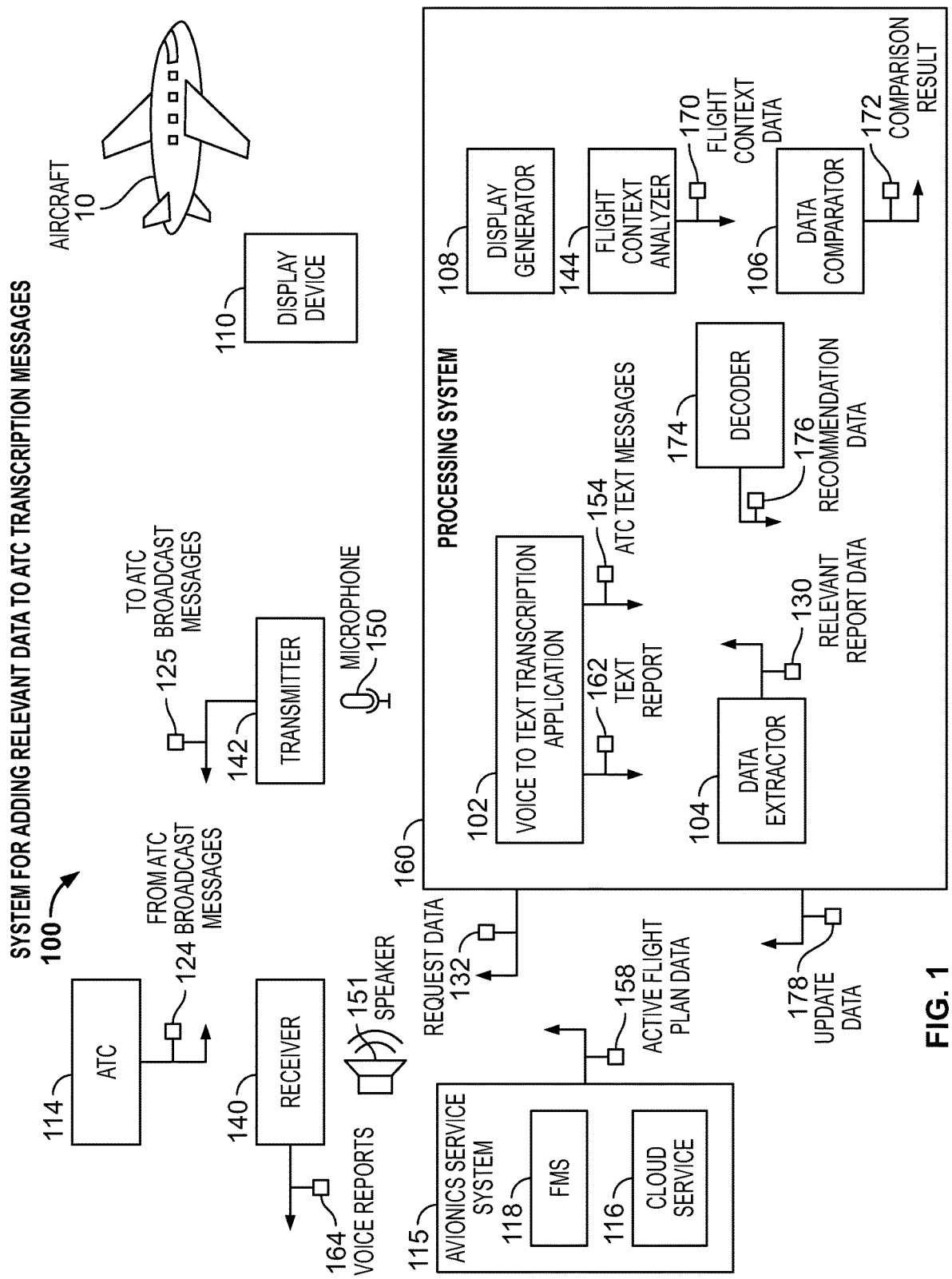
FIG. 1 is a block diagram of system for adding relevant data to ATC transcription messages, in accordance with an exemplary embodiment.
Figure 3:
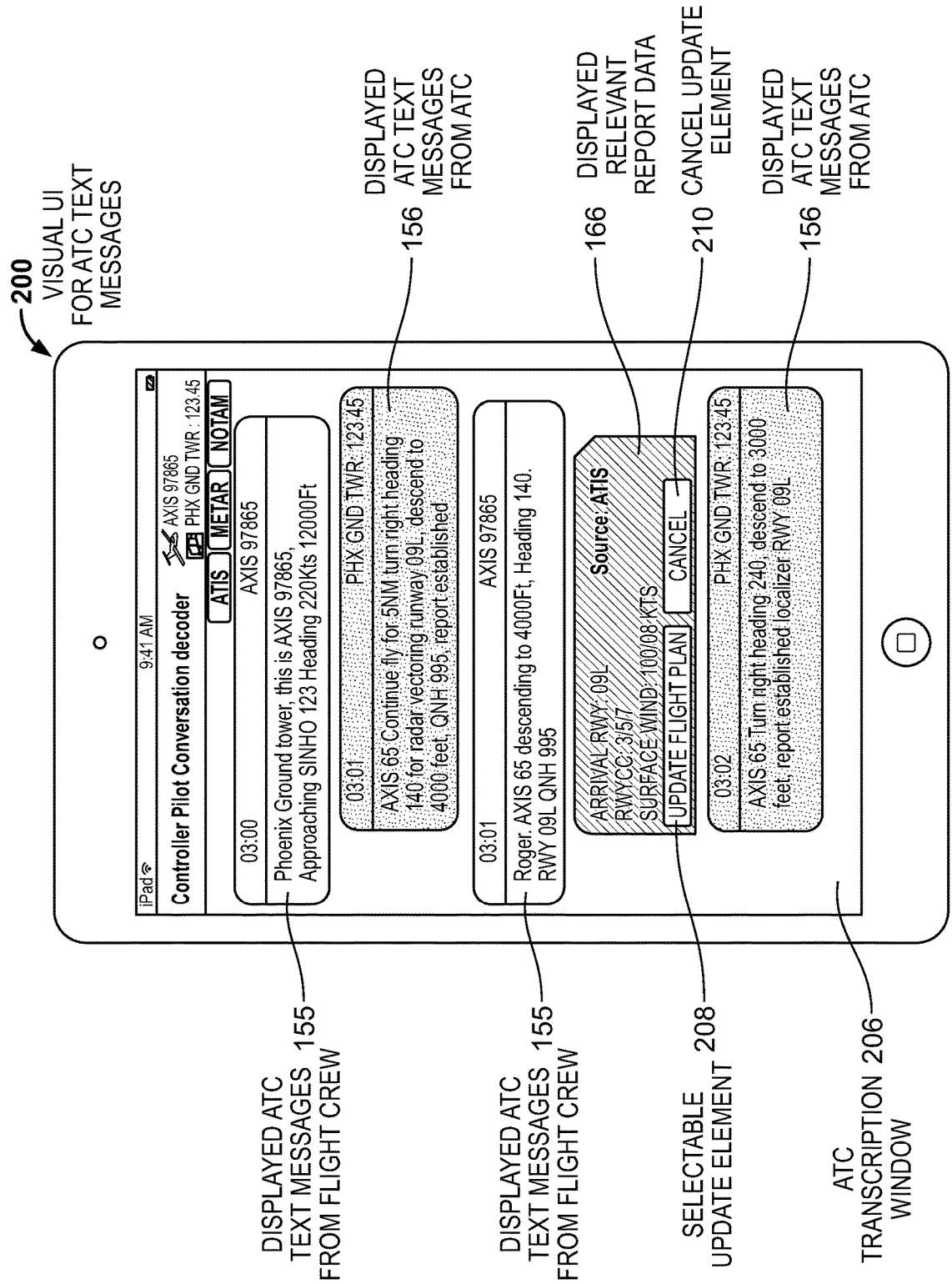
Figure 4:
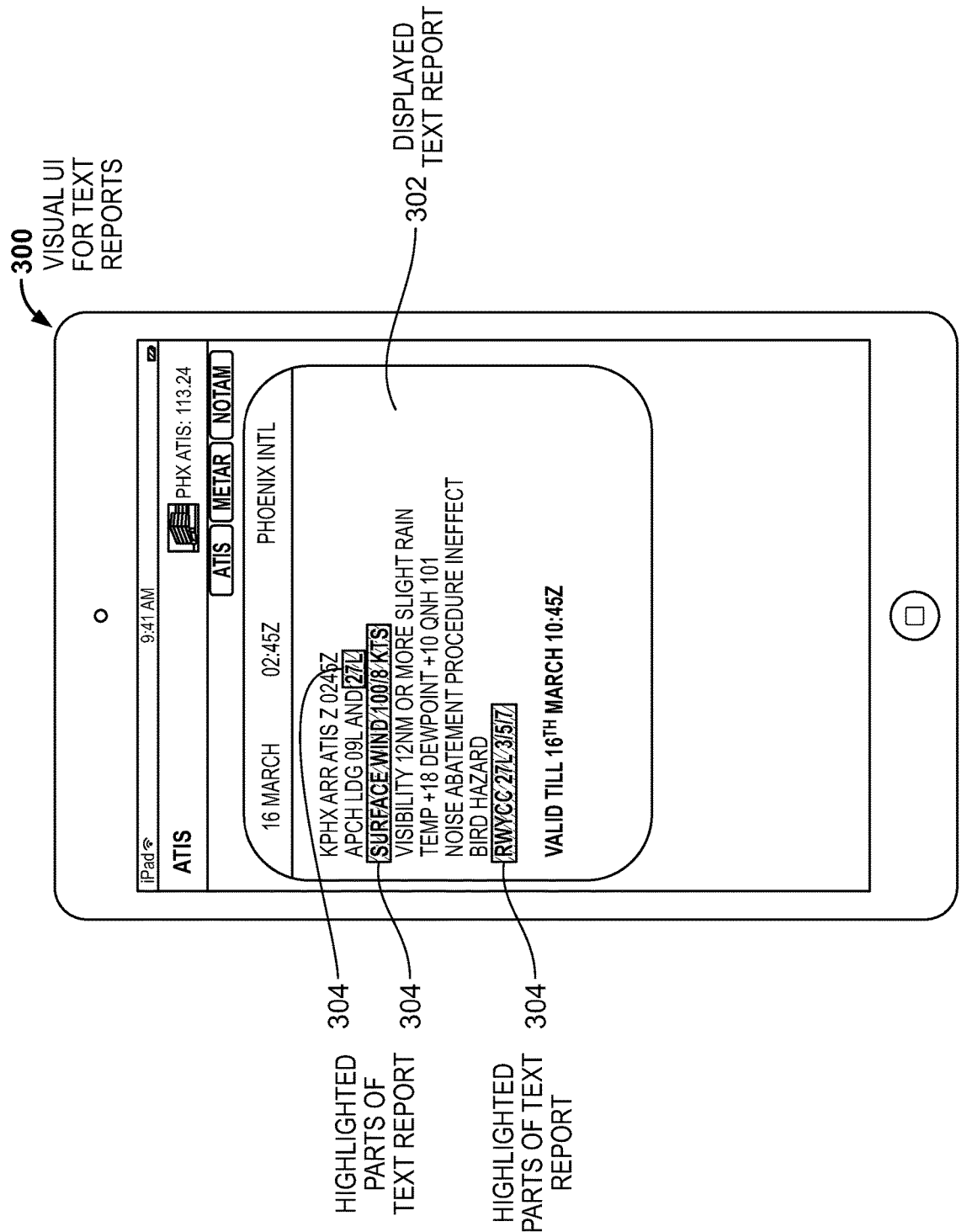
FIGS. 4 and 5 depict exemplary visual user interfaces for text reports, in accordance with exemplary embodiments.

FIG. 1 depicts an exemplary embodiment of a system 100 for adding relevant data to ATC transcription messages. The system 100 is associated with an aircraft 10. The illustrated system 100 includes a processing system 160 configured to execute a voice to text transcription application 102 coupled to a data extractor 104, a data comparator 106, a flight context analyzer 144 and a display generator 108. The voice to text transcription application 102 receives ATC broadcast messages 124, 125 sent between ATC 114 and a member of the flight crew in voice form. The system 100 further includes a display device 110 for rendering an ATC transcription window 206 (see FIGS. 2 and 3) with displayed ATC text messages 155, 156 that have been transcribed by the voice to text transcription application 102. Further, voice reports 164 (e.g. ATIS voice reports) are transcribed by the voice to text transcription application 102 to generate a text report 162, which can be displayed as shown in FIGS. 3 and 4. The text report 162 is filtered by the processing system 160 as to relevancy to an active flight plan, current flight context and/or the ATC text messages 154 to provide relevant report data 130. At least part of the relevant report data 130 is displayed in the ATC transcription window 206 in the form of displayed relevant report data 166. The system 100 further includes an avionics service system 115 that provides flight plan data 158 from the FMS 118 describing an active flight plan and the current status of the aircraft 10 along the flight plan.

Figure 7:
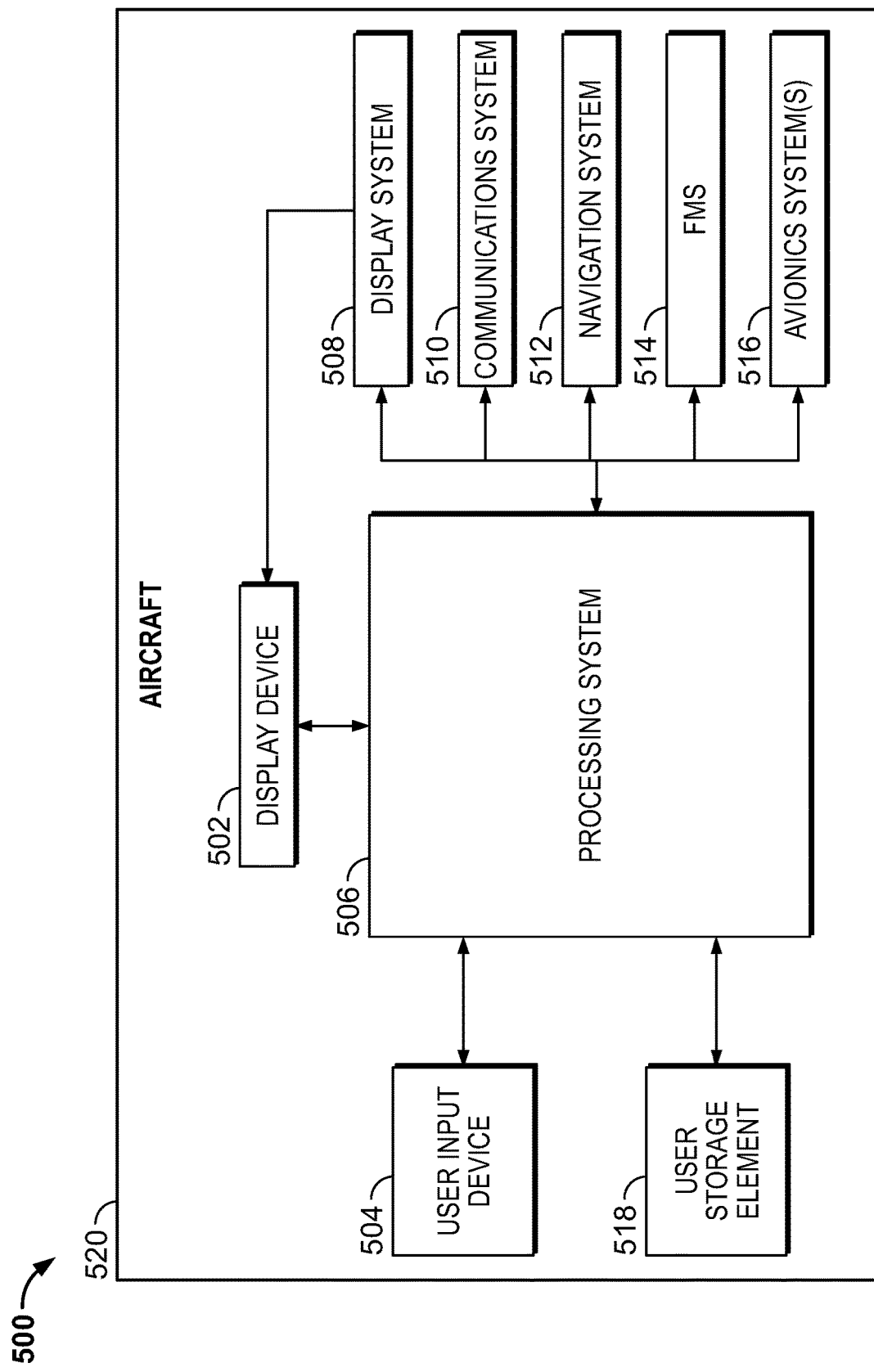
FIG. 7 depicts an exemplary embodiment of an aircraft system suitable for adding relevant data to ATC transcription messages, in accordance with one or more embodiments.

The system 100 is implemented, at least in part, by a processing system 506 as described in further detail below with respect to FIG. 7. The processing system 506 executes programming instructions to analyze ATC text messages 154 based on flight context and to extract relevant report data 130 based at least partly on the analysis and further to present displayed ATC text messages 155, 156 in association with displayed relevant report data 166 in the ATC transcription window 206 (see FIGS. 2 and 3). It should be appreciated that FIG. 1 is a simplified representation of the system 100 associated with an aircraft 10 for purposes of explanation and is not intended to limit the subject matter in any way. In this regard, it will be appreciated that, in practice, the system 100 onboard the aircraft 10 may include any number of different onboard systems configured to support operation of the aircraft 10, and the subject matter described herein is not limited to any particular type or number of onboard systems.

The ATC 114 is a service provided for the purpose of: preventing collisions between aircraft and on the maneuvering area between aircraft and obstructions; and expediting and maintaining an orderly flow of air traffic. Before take-off, the aircraft 10 submits a flight plan to ATC 114. The path of the aircraft 10 may have to be changed from the original flight plan, e.g. to move around bad weather or avoid a congested sector. The pilot may request a change to the flight plan by submitting such a request to the ATC 114. The changes may include changes in flight parameters like heading, speed and/or altitude and also changes in target runway and other landing information.

The system 100 of FIG. 1 includes a receiver 140 and a transmitter 142. The receiver 140 receives FROM ATC broadcast messages 125 over a voice based radio channel. The receiver further receives voice reports 164 over another voice based radio channel. The voice reports 164 may be ATIS reports, METAR reports, NOTAM reports, Pilot Reports (PIREP), and the like. The transmitter 142 broadcasts TO ATC broadcast messages 124 over the voice based radio channel. The TO ATC broadcast messages 125 are initiated by a member of the flight crew speaking into a microphone 150, which may be part of a headset. The received FROM ATC broadcast messages 124 may be heard by a member of the flight crew through a speaker 151, which may be part of the headset.

The ATC broadcast messages 124, 125 (which include both received and transmitted ATC broadcast messages 124, 125 by/from the aircraft 10) and the voice reports 164 can be passed to the voice to text transcription application 102 for conversion from a voice format to a text format. The voice to text transcription application 102 can use any suitable technique for performing conversion from voice to text. The voice to text transcription application 102 may use artificial intelligence (e.g. a recurrent neural network) that transcribes analog or digital aviation audio into text in near-real time.

The artificial intelligence application is trained with an aviation specific dataset allowing the voice to text transcription application 102 to perform better than general natural language processing applications, which can provide inaccurate transcriptions due to cadence, noise, and vocabulary of the aviation industry. In some embodiments, separate voice to text transcription applications 102 may be provided for the voice reports 164 and the ATC broadcast messages 124, 125 so that the respective voice to text transcription applications 102 can be optimally configured for the different lexicons and voice styles of the voice reports 164 and the ATC broadcast messages 124, 125.

The voice to text transcription application 102 outputs ATC text messages 154 and a text report 162 (or reports) that are provided to the display generator 108 for display on the display device 110. In embodiments, the receiver 140 receives FROM ATC broadcast messages 124 that are relevant to the ownship aircraft 10 and also other aircraft. The processing system 160 is configured to sort messages directed to the ownship aircraft 10 from those directed to other aircraft so that the display generator 108 exclusively displays ATC text messages 154 that are relevant to the ownship aircraft 10. The processing system 160 can perform this sorting processing by comparing an identifier of the ownship aircraft 10 with an identifier that is used by ATC 114 (and transcribed by the voice to text transcription application 102) with respect to each ATC text message 154.

The avionics service system 115 includes a Flight Management System (FMS) 118, which is an on-board multi-purpose navigation, performance, and aircraft operations computer. A primary function of the FMS 118 is in-flight management of a flight plan. Using various sensors (such as Global Positioning System (GPS) and Inertial Navigation System (INS) often backed up by radio navigation) to determine the position of the aircraft 10, the FMS 118 can guide the aircraft 10 along the flight plan. The FMS 118 sends the flight plan for display to an Electronic Flight Instrument System (EFIS), a Navigation Display (ND), and/or a Multifunction Display (MFD). A flight plan contains the following information as is relevant to the flight, by way of example: aircraft identification, flight rules and type of flight, number and type(s) of aircraft and wake turbulence category, equipment, departure aerodrome, estimated off-block time, cruising speed, cruising level, route to be followed, destination aerodrome and total estimated elapsed time, alternate destination aerodrome, fuel endurance, total number of persons on board, emergency and survival equipment, and other information.

In embodiments, the flight context analyzer 144 receives active flight plan data 158 embodying the flight plan from the avionics service system 115, particularly from the FMS 118. The flight plan data 158 may be provided through a cloud service 116 connected to the FMS 118. Other interfaces (e.g. an Application Programming Interface) to connect to the FMS 118 are possible. In some embodiments, the processing system 160 and the display device 110 is provided as part of an electronic flight bag (EFB) device that wirelessly connects to the FMS 118. The flight plan data 158 further includes a current location of the aircraft 10 along the active flight plan. The flight context analyzer 144 further receives the ATC text messages 154 to determine flight context from the communications between the flight crew and the ATC 114. In particular, reference to landing or departure information (e.g. runways, route to be taken, instrument vectoring, aerodrome conditions) can all be factored into the flight context. Furthermore, the proximity of the aircraft 10 to a destination or departure runway, or its progress along the flight plan towards the destination runway relative to certain threshold markers, is factored into the flight context. The flight context is embodied into output flight context data 170.

In embodiments, the data extractor 104 receives the text report 162 and the flight context data 170. The data extractor 104 isolates data in the text report 162 that is relevant to the flight context based on the flight context data 170. For example, report data relevant to a destination runway set in the flight plan is extracted or requested changes (or other clearance information) to the destination runway according to the ATC text messages 154 described in the flight context data 170 are extracted. A location of the aircraft along the flight plan may also be determinative on relevancy of the information in the text report 162. For example, runway conditions described in the text report 162 may not become relevant until the final approach stage is reached. In one embodiment, the data extractor 104 organizes the text report 162 in a table structure that groups together runway specific information. Other information groups may also be defined relative to other key field information. The flight context data 170 may include runway information based on the active flight plan or the ATC text messages 154 (or other key field information) and the table structure can be looked up based thereon in order to extract the relevant report data 130. The data extractor 104 acts as a filter of the text report 162 to extract relevant parts of the data contained in the text report 162 based on the flight context described in the flight context data 170. The data extractor 104 outputs the extracted relevant data as relevant report data 130.

In embodiments, the data comparator 106 receives the relevant report data 130 and compares information contained therein with corresponding information contained in the active flight plan data 158. For example, runway conditions, weather information, destination runway and other data items are compared. The data comparator 106 outputs a comparison result 172 identifying changed data in the text report 162 as compared to the corresponding information in the active flight plan data 158. In this way, the display generator is able to highlight the changed data when displaying the text report, as will be described with respect to FIGS. 4 and 5.

In embodiments, the processing system 160 includes a decoder 174 that receives the comparison result 172 and determines which, if any, of the changed information should be submitted to the FMS 118 as part of a flight plan update. For example, changed wind information, changed destination runway information, changed runway conditions, etc. may need to be submitted to the FMS 118. The decoder 174 assesses which of the relevant report data 130 that has changed (according to the comparison result 172) should be recommended as a flight plan update according to predetermined rules. The decoder 174 thus outputs recommendation data 176 representing a recommendation to update the flight plan.

Figure 5:
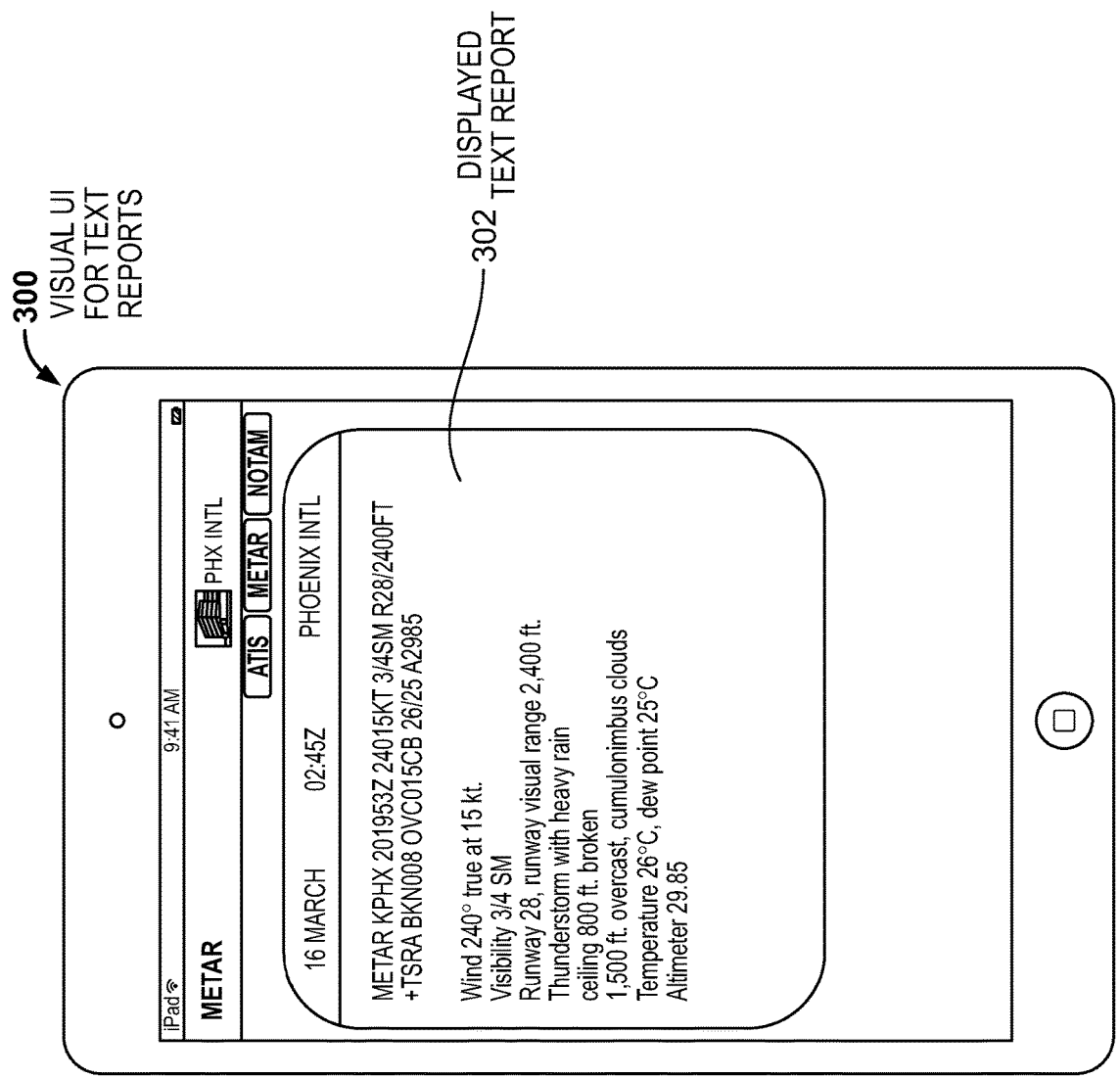

In embodiments, the processing system 160 includes a display generator 108 for generating an ATC transcription window 206 for the display device 110 as exemplified in FIGS. 3 and 4 and a displayed text report 302 as exemplified in FIGS. 4 and 5. The ATC transcription window 206 includes displayed ATC text messages 155, 156 according to the ATC text messages 154 from the voice to text transcription application 102. The ATC transcription window 206 further includes displayed relevant report data 166, which is generated based on the text report 162 and may focus on changed data according to the comparison result 172. Further, the displayed relevant report data 166 may display report data that should be submitted to the FMS 118 as an update to the flight plan according to the recommendation data 176. In embodiments, the display generator 108 associates a selectable update element 208 with the displayed relevant report data 166 that gives a flight crew member the option to accept the recommended update to the flight plan. When the selectable update element 208 is selected by a user operating a user input device (not shown), update data 178 is sent to the FMS 118 from the processing system 160 and the FMS incorporates the update data 178 into the active flight plan. The displayed text report 302 includes the text report 162 and may also highlight changed parts of the text report 162 as compared to that submitted into the FMS 118 as part of the process of setting up the flight plan (e.g. prior to departure). The highlighted changes are according to the comparison result 172.

An ATIS report may include one or more of the following data items: name of aerodrome, arrival and/or departure indicator, contract type, if communication is via D-ATIS, designator, time of observation, if appropriate, type of approach(es) to be expected, the runway(s) in use, status of arresting system constituting a potential hazard, if any, significant runway surface conditions and, if appropriate, braking action, holding delay, if appropriate, transition level, if applicable, other essential operational information, surface wind direction (in degrees magnetic) and speed, including significant variations and, if surface wind sensors related specifically to the sections of runway(s) in use are available and the information is required by operators, the indication of the runway and the section of the runway to which the information refers, visibility and, when applicable, RVR, present weather, cloud below 1500 m (5000 ft) or below the highest minimum sector altitude, whichever is greater; cumulonimbus; if the sky is obscured, vertical visibility when available, air temperature, dew point temperature, altimeter setting(s), any available information on significant meteorological phenomena in the approach and climb-out areas including wind shear, and information on recent weather of operational significance, trend forecast, when available; and specific ATIS instructions. Some of this information may not be relevant to the flight context. For example, information relating to a runway that is not a target for the aircraft 10 according to its flight plan is not relevant. Further, data already known to the pilot according to the flight plan data 158 may be considered not relevant. Yet further, information may only be relevant at certain stages along the flight plan (e.g. cloud information may not relevant once the cloud ceiling has been passed). The data extractor 104 and the data comparator 106 work together to sort part of relevant report data 130 to be displayed in the ATC transcription window 206 to provide contextualized report updates as part of the ATC transcription. Further, the conversation between the ATC and the flight crew may alter the parts of the text report 162 that are considered relevant (e.g. when a runway change is being requested by the ATC 114).

Other reports may also be processed by the processing system 160 including METARs and NOTAMs. The METARs may include one or more of the following data items: location, date/time of report, surface wind, visibility, runway visual range, weather type, cloud information, temperature, QNH, wind shear, runway state, and trend. NOTAMs include one or more of the following data items: hazards (such as air shows, parachute jumps and glider or micro-light flying), flights by important people (such as heads of state), closed runways or taxiways, unserviceable navigational instruments, airspace restrictions, unserviceable lights on tall obstructions, and temporary obstacles.

Figure 2:
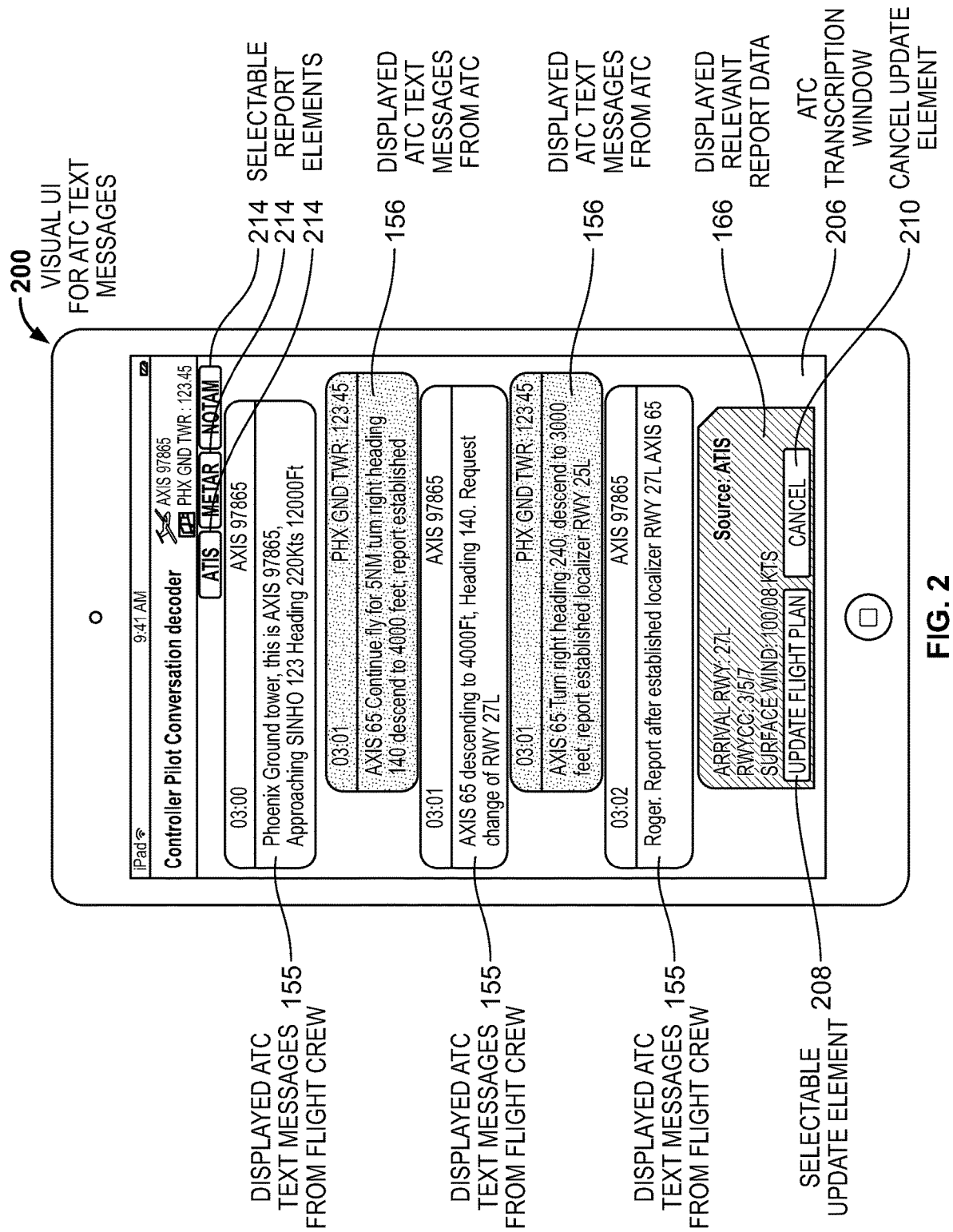
FIGS. 2 and 3 depict exemplary visual user interfaces for ATC text messages, in accordance with exemplary embodiments.

In an exemplary embodiment, the processing system 160 generates a visual UI 200 for ATC text messages as shown in FIG. 2 using information contained within a text report that is detailed with respect to the visual UI 300 for text reports as shown in FIG. 4. The voice to text transcription application 102 transcribes ATC broadcast messages 124, 125 and the voice reports 164. The display generator 108 outputs displayed ATC text messages 156 from the ATC and displayed ATC text messages 155 from the flight crew in the ATC transcription window 206. In the same ATC transcription window 206, the display generator 108 outputs displayed relevant report data 166 based on the text report 162. The flight context analyzer 144 analyzes the ATC text messages 154 and the active flight plan data 158 to produce flight context data 170 defining a flight context for use in determining relevancy of data contained in the text report 162. In the example of FIG. 2, the flight context includes a "request change of RWY 27L" message, which is interpreted by the flight context analyzer 144 as being a relevant data item for filtering the text report 162. The data extractor 104 filters the ATIS report based on the flight context data 170, specifically based on the requested runway change to runway 27L. Referring to FIG. 4, the data extractor 104 finds the relevant report data 130 including wind and surface conditions information for that runway. The text report 162 may be an ATIS report, a METAR report and/or a NOTAM report. The data comparator 106 compares this information with that already entered into the FMS 118 as defined by the active flight plan data 158. Since the FMS 118 has been entered with information for a different runway, the comparison result 172 will indicate all of the information about runway 27L as being new information. Based on the comparison result 172, the display generator 108 highlights the new information as shown by the highlighted parts 304 of the displayed text report 302. The decoder 174 receives the comparison result 172 and assesses whether changes should be submitted to the FMS 118. The decoder 174 provides recommendation data 176 that describes relevant report data 130 from the text report 162 that has been determined to be suitable for an update submission to the FMS 118. In one embodiment, the part (or whole) of the relevant report data 130 is detailed in the displayed relevant report data 166 along with the selectable update element 208 and a cancel update element 210. When the selectable update element 208 is selected by the pilot, update data 178 carrying the new, relevant, information from the text report 162 is sent to the FMS 118 or other sub-system of the aircraft. In the present example, the update data 178 includes a request to change to runway 27L, the runway surface conditions (3/5/8) and runway surface wind conditions (100/08 KTS).

Continuing to refer to FIG. 2, the visual UI 200 for ATC text messages includes selectable report elements 214 allowing the pilot to view the text reports 162 including an ATIS text report, a METAR text report and a NOTAM text report. In one example, when the ATIS selectable report element 214 is selected, the ATIS report of FIG. 4 is displayed including the highlighted parts 304 to show the changed information that is relevant to the flight context.

Another exemplary visual UI 200 for ATC text messages is illustrated in FIG. 3. The visual UI 200 includes displayed ATC text messages 156 from the flight crew and displayed ATC text messages 156 from the ATC 114. The displayed ATC text messages 155, 156 have been generated by the voice to text transcription application 102, as described previously. In the present example, the runway is not being changed and matches that of the active flight plan data 158. However, the text report 162 from the ATIS report indicates that runway conditions and wind conditions have changed. The flight context data 170 identifies runway 09L as being of relevance to further processing based on the runway of the active flight plan data 158 and an analysis of the ATC text messages 154 that do not include any requests to change runway. The data extractor 104 filters the text report 162 to find information relating to the identified runway 09L. The data extractor 104 extracts relevant report data 130 including information on wind and surface conditions for runway 09L. The data comparator determines that this information is different from that entered into the flight plan included in the active flight plan data 158 and thus identifies the new flight plan information. The decoder 174 works with the display generator 108 to display the changed wind and runway information along with a selectable update element 208 that initiates submission of the changed information to the FMS 118. Further, the display generator 108 highlights the changed, relevant information in the displayed text report 302.

Referring to FIG. 5, another exemplary visual UI 300 for text report is shown, which includes a displayed text report 302. The text report of FIG. 5 is a METAR report that has been transcribed by the voice to text transcription application 102. The METAR report of FIG. 5 may be analyzed by the processing system 160 to extract relevant information to a particular flight plan and incorporate that information into an ATC transcription window 206. For example, an active flight plan, or change in active flight plan requested with the ATC 114, 114 including runway 28 may result in the visual range of 2400 feet being included in the ATC transcription window 206 along with a selectable update element 208 to submit the new information to the FMS 118.

Figure 6:
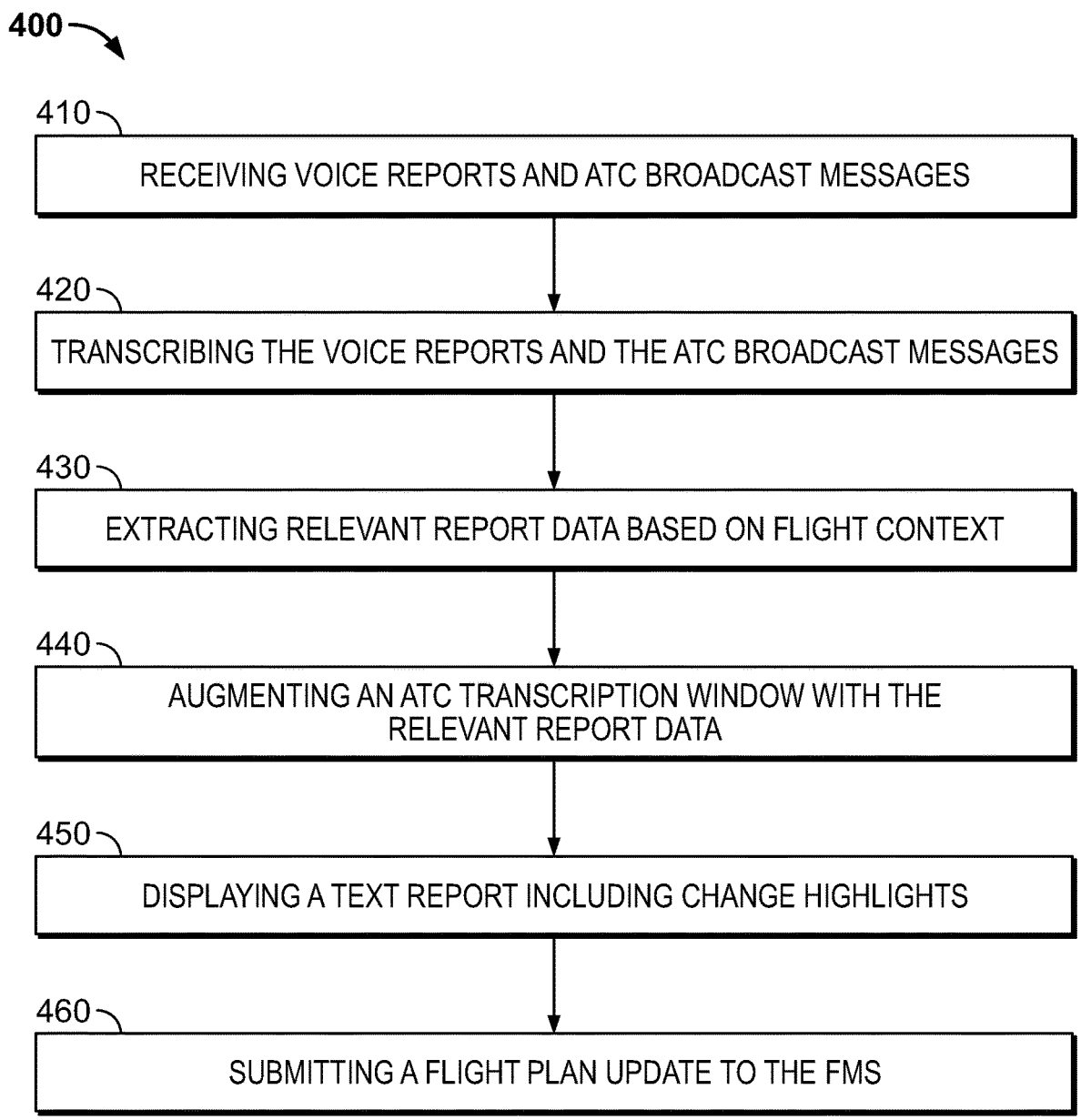
FIG. 6 is a flowchart of a method for adding relevant data to ATC transcription messages, in accordance with an embodiment.

A flow chart of an exemplary method 400 of adding relevant data to ATC transcription messages is provided in FIG. 6. The method 400 is computer implemented by the processing system 506 of FIG. 5 or by the various modules of the processing system 160 of FIG. 1.

The method 400 includes step 410 of receiving voice reports 164 (e.g. ATIS, METAR and/or NOTAM reports) and ATC broadcast messages 124, 125 between the flight crew and the ATC. In step 420, the processing system 160 transcribes the voice reports 164 and the ATC broadcast messages 124, 125 to provide one or more text reports 162 and ATC text messages 154. The transcription can take place using the same voice to text transcription application 102 or different voice to text transcription applications 102.

In step 430, relevant report data 130 is extracted from the text report 162 based on flight context. The flight context can include location of the aircraft 10 including flight phase and proximity to a take-off or landing runway. The flight context can be derived from an analysis of the ATC text messages 154, particularly any clearance information. The flight context can be derived from a currently active flight plan as described in active flight plan data 158.

In step 440, an ATC transcription window 206 is generated by the processing system 160, which includes the ATC text messages 154 directed to/from the ownship aircraft 10. The ATC transcription window 206 is augmented so as to include at least some of the relevant report data 130. Further, the ATC transcription window may include a UI element, namely the selectable update element 208, that can be selected to update the flight plan (by submission to the FMS 118), in step 460, with the relevant report data 130 when selected by the flight crew. In step 450, the text report 162 that has been transcribed by the processing system 160 is displayed in another window with highlighted parts 304 showing data items that have been determined to be relevant to flight context (e.g. based on an active flight plan and ATC conversation) and which are different from corresponding data items in the active flight plan.

FIG. 5 depicts an exemplary embodiment of an aircraft system 500 suitable for implementing the system 100 of FIG. 1. The illustrated aircraft system 500 (corresponding to system 100 of FIG. 1) includes, without limitation, a display device 502 (corresponding to display device 110 of FIG. 1), one or more user input devices 504, a processing system 506 (for implementing functions and methods described herein with respect to system 100), a communications system 510, a navigation system 512, a flight management system (FMS) 514 (corresponding to the FMS 118 of FIG. 1), one or more avionics systems 516, and a data storage element 518 (suitably configured to support operation of the system 500).

In exemplary embodiments, the display device 502 is realized as an electronic display capable of graphically displaying flight information or other data associated with operation of the aircraft 520 under control of the display system 508 and/or processing system 506. In this regard, the display device 502 is coupled to the display system 508 and the processing system 506, wherein the processing system 506 and the display system 508 are cooperatively configured to display, render, or otherwise convey one or more graphical representations or images associated with operation of the aircraft 520 on the display device 502. The user input device 504 is coupled to the processing system 506, and the user input device 504 and the processing system 506 are cooperatively configured to allow a user (e.g., a pilot, co-pilot, or crew member) to interact with the display device 502 and/or other elements of the system 500, as described herein. Depending on the embodiment, the user input device(s) 504 may be realized as a keypad, touchpad, keyboard, mouse, touch panel (or touchscreen), joystick, knob, line select key or another suitable device adapted to receive input from a user. In some embodiments, the user input device 504 includes or is realized as an audio input device, such as a microphone, audio transducer, audio sensor, or the like, that is adapted to allow a user to provide audio input to the system 500 in a "hands free" manner without requiring the user to move his or her hands, eyes and/or head to interact with the system 500.

The processing system 506 generally represents the hardware, software, and/or firmware components configured to facilitate communications and/or interaction between the elements of the aircraft system 500 and perform additional tasks and/or functions to support the system 100 of FIG. 1 during operation of the aircraft system 500, as described herein. Depending on the embodiment, the processing system 506 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 506 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 506 includes processing logic that may be configured to carry out the functions, techniques, and processing tasks associated with the operation of the aircraft system 500, as described herein. Furthermore, the steps of a method or algorithm described in connection with the embodiments disclosed herein may be embodied directly in hardware, in firmware, in a software module executed by the processing system 506, or in any practical combination thereof. For example, in one or more embodiments, the processing system 506 includes or otherwise accesses a data storage element 518 (or memory), which may be realized as any sort of non-transitory short- or long-term storage media capable of storing programming instructions for execution by the processing system 506. The code or other computer-executable programming instructions, when read and executed by the processing system 506, cause the processing system 506 to support or otherwise perform certain tasks, operations, and/or functions described herein in the context of the flight rules alerts. Depending on the embodiment, the data storage element 518 may be physically realized using RAM memory, ROM memory, flash memory, registers, a hard disk, or another suitable data storage medium known in the art or any suitable combination thereof.

The display system 508 generally represents the hardware, software, and/or firmware components configured to control the display and/or rendering of one or more navigational maps and/or other displays pertaining to operation of the aircraft 520 and/or onboard systems 510, 512, 514, 516 on the display device 502. In this regard, the display system 508 may access or include one or more databases suitably configured to support operations of the display system 508, such as, for example, a terrain database, an obstacle database, a navigational database, a geopolitical database, a terminal airspace database, a special use airspace database, or other information for rendering and/or displaying navigational maps and/or other content on the display device 502.

Still referring to FIG. 5, in an exemplary embodiment, the processing system 506 is coupled to the navigation system 512, which is configured to provide real-time navigational data and/or information regarding operation of the aircraft 520. The navigation system 512 may be realized as a global navigation satellite system (e.g., a global positioning system (GPS), a ground-based augmentation system (GBAS), a satellite-based augmentation system (SBAS), and/or the like), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 512, as will be appreciated in the art. The navigation system 512 is capable of obtaining and/or determining the instantaneous position of the aircraft 520, that is, the current (or instantaneous) location of the aircraft 520 (e.g., the current latitude and longitude) and the current (or instantaneous) altitude or above ground level for the aircraft 520. The navigation system 512 is also capable of obtaining or otherwise determining the heading of the aircraft 520 (i.e., the direction the aircraft is traveling in relative to some reference). In the illustrated embodiment, the processing system 506 is also coupled to the communications system 510, which is configured to support communications to and/or from the aircraft 520. For example, the communications system 510 may support communications between the aircraft 520 and air traffic control or another suitable command center or ground location. In this regard, the communications system 510 may be realized using a radio communication system and/or another suitable data link system.

In an exemplary embodiment, the processing system 506 is also coupled to the FMS 514, which is coupled to the navigation system 512, the communications system 510, and one or more additional avionics systems 516 to support navigation, flight planning, and other aircraft control functions in a conventional manner, as well as to provide real-time data and/or information regarding the operational status of the aircraft 520 to the processing system 506. Although FIG. 5 depicts a single avionics system 516, in practice, the aircraft system 500 and/or aircraft 520 will likely include numerous avionics systems for obtaining and/or providing real-time flight-related information that may be displayed on the display device 502 or otherwise provided to a user (e.g., a pilot, a co-pilot, or crew member). For example, practical embodiments of the aircraft system 500 and/or aircraft 520 will likely include one or more of the following avionics systems suitably configured to support operation of the aircraft 520: a weather system, an air traffic management system, a radar system, a traffic avoidance system, an autopilot system, an autothrust system, a flight control system, hydraulics systems, pneumatics systems, environmental systems, aircraft systems, engine systems, trim systems, lighting systems, crew alerting systems, electronic checklist systems, an electronic flight bag and/or another suitable avionics system. In various embodiments, the processing system 506 may obtain information pertaining to the current location and/or altitude of the aircraft 520 and/or other operational information characterizing or otherwise describing the current operational context or status of the aircraft 520 from one or more of the onboard systems 508, 510, 512, 514, 516.

It should be understood that FIG. 5 is a simplified representation of the aircraft system 500 for purposes of explanation and ease of description, and FIG. 5 is not intended to limit the application or scope of the subject matter described herein in any way. It should be appreciated that although FIG. 10 shows the various elements of the system 500 being located onboard the aircraft 520 (e.g., in the cockpit), in practice, one or more of the elements of the system 500 may be located outside the aircraft 520 (e.g., on the ground as part of an air traffic control center or another command center) and communicatively coupled to the remaining elements of the aircraft system 500 (e.g., via a data link and/or communications system 510). For example, in some embodiments, the data storage element 518 may be located outside the aircraft 520 and communicatively coupled to the processing system 506 via a data link and/or communications system 510. Furthermore, practical embodiments of the aircraft system 500 and/or aircraft 520 will include numerous other devices and components for providing additional functions and features, as will be appreciated in the art. In this regard, it will be appreciated that although FIG. 5 shows a single display device 502, in practice, additional display devices may be present onboard the aircraft 520. Additionally, it should be noted that in other embodiments, features and/or functionality of processing system 506 described herein can be implemented by or otherwise integrated with the features and/or functionality provided by the FMS 514. In other words, some embodiments may integrate the processing system 506 with the FMS 514. In yet other embodiments, various aspects of the subject matter described herein may be implemented by or at an electronic flight bag (EFB) or similar electronic device that is communicatively coupled to the processing system 506 and/or the FMS 514.

For the sake of brevity, conventional techniques related to sensors, statistics, data analysis, avionics systems, redundancy, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of converting voice to text messages in an aircraft, the method comprising:
   transcribing, using a voice to text application, a plurality of voice messages between a member of flight crew of the aircraft and Air Traffic Control (ATC) to provide a plurality of ATC text messages, each of the plurality of ATC text messages corresponding to one of the plurality of voice messages;

transcribing, using the voice to text application, a voice-automatic terminal information service report (voice-ATIS) to provide an ATIS text report;

determining, via at least one processor, flight context data based at least on an analysis of the plurality of ATC text messages;

determining, via the at least one processor, relevant ATIS data in the ATIS text report using the flight context data; and rendering, via the at least one processor, a visual User Interface (UI) on a display device, the visual UI including the transcription of at least two of the plurality of ATC text messages and the transcription of the relevant ATIS data on a single ATC transcription page.

2. The method of claim 1, wherein the visual UI includes a selectable ATIS element that, when selected, causes rendering of an ATIS transcription page including the ATIS text report.

3. The method of claim 1, comprising:
receiving, via the at least one processor, an active flight plan from a Flight Management System (FMS) of the aircraft; and
determining, via the at least one processor, the flight context data based at least on an analysis of the plurality of ATC text messages and the active flight plan.

4. The method of claim 1, comprising:
receiving, via the at least one processor, an active flight plan from a Flight Management System (FMS) of the aircraft;
comparing the relevant ATIS data to data included in the active flight plan; and
highlighting part of the ATIS text report based on the comparison.

5. The method of claim 1 comprising:
receiving, via the at least one processor, an active flight plan from a Flight Management System (FMS) of the aircraft; and
determining, via the at least one processor, update data representing a recommended update to the active flight plan based on a comparison between the relevant ATIS data and the active flight plan.

6. The method of claim 5, wherein the visual UI includes a selectable update element that, when selected, causes the update data to be submitted to the FMS of the aircraft.

7. The method of claim 1, wherein the ATIS text report includes at least one of: runway condition information, runway in use information, surface wind information, weather information, visibility information, cloud height information, approach type information, and holding information.

8. The method of claim 3, wherein the plurality of ATC text messages include a description of an update to the active flight plan and the relevant ATIS data in the ATIS text report is determined based on the update to the active flight plan.

9. The method of claim 8, wherein the update to the active flight plan includes one of a change in an arrival runway to a new arrival runway and a change in a departure runway to a new departure runway, and the relevant ATIS data associated with the update to the active flight plan includes at least one of: runway condition information for the new arrival runway, runway condition information for the new departure runway, runway wind information for the new arrival runway, and runway wind information for the new departure runway.

10. The method of claim 9, wherein the visual UI includes a selectable update element that, when selected, causes the update to be submitted to the FMS of the aircraft.

11. The method of claim 1, wherein determining the relevant ATIS data from the ATIS text report using the flight context data includes determining the relevant ATIS data based at least in part on proximity of the aircraft to a location referenced in the ATIS text report.

12. The method of claim 1, comprising:
transcribing using the voice to text application, at least one other report, the at least one other report including at least one of an Aviation Routine Weather Report (METAR), an Aviation Selected Special Weather Report (SPECI), a Notice to Air Mission (NOTAM), and a Pilot Report (PIREP);
determining, via the at least one processor, additional relevant data from the at least one other report using the flight context data; and
rendering, via the at least one processor, the visual User Interface (UI) to include the at least two of the plurality of ATC text messages and the additional relevant data on the single ATC transcription page.

13. The method of claim 1, wherein the visual UI depicts the plurality of ATC text messages and the relevant ATIS data on the single ATC transcription page in a visually differentiated manner.

14. A system for converting voice to text messages in an aircraft, the system comprising:
a receiver and transmitter for receiving and transmitting voice messages between a member of flight crew and Air Traffic Control (ATC);
a display device;
at least one processor in operable communication with the receiver and transmitter and the display device, the at least one processor configured to execute program instructions, wherein the program instructions are configured to cause the at least one processor to:
transcribe a plurality of voice messages between the member of flight crew and the ATC to provide a plurality of ATC text messages, each of the plurality of ATC text messages corresponding to one of the plurality of voice messages;
transcribe a voice-automatic terminal information service report (voice-ATIS) to provide an ATIS text report;
determine flight context data based at least on an analysis of the plurality of ATC text messages;
determine relevant ATIS data in the ATIS text report using the flight context data; and
render a visual User Interface (UI) on the display device, the visual UI including the transcription of at least two of the plurality of ATC text messages and the transcription of the relevant ATIS data on a single ATC transcription page.

15. The system of claim 14, wherein the program instructions are configured to cause the at least one processor to:
receive an active flight plan from a Flight Management System (FMS) of the aircraft; and
determine the flight context data based at least on an analysis of the plurality of ATC text messages and the active flight plan.

16. The system of claim 14, wherein the program instructions are configured to cause the at least one processor to:

receive an active flight plan from the Flight Management System (FMS) of the aircraft; and determine update data representing a recommended update to the active flight plan based on a comparison between the relevant ATIS data and the active flight plan.

17. The system of claim 16, wherein the visual includes a selectable update element that, when selected, causes the update data to be submitted to the FMS of the aircraft.

18. The system of claim 14, wherein determining the relevant ATIS data from the ATIS text report using the flight context data includes determining the relevant ATIS data based at least in part on proximity of the aircraft to a location referenced in the ATIS text report.

19. The system of claim 14, wherein the plurality of ATC text messages include a description of an update to an active flight plan and the relevant ATIS data is determined based on ATIS data associated with the update to the active flight plan.

* * * * *